US007080343B2

(12) United States Patent
Asai et al.

(10) Patent No.: US 7,080,343 B2
(45) Date of Patent: Jul. 18, 2006

(54) APPARATUS AND METHOD FOR SELECTING A PRINTED CIRCUIT BOARD

(75) Inventors: Junko Asai, Ritto (JP); Toshio Mukai, Shiga-ken (JP); Toshihiko Nishio, Moriyama (JP)

(73) Assignee: International Business Machines Corporation, Armonk, NY (US)

( * ) Notice: Subject to any disclaimer, the term of this patent is extended or adjusted under 35 U.S.C. 154(b) by 282 days.

(21) Appl. No.: 10/431,725

(22) Filed: May 8, 2003

(65) Prior Publication Data

US 2003/0212978 A1  Nov. 13, 2003

(30) Foreign Application Priority Data

May 13, 2002 (JP) ............... 2002-137525

(51) Int. Cl.
G06F 17/50 (2006.01)
H01L 27/10 (2006.01)

(52) U.S. Cl. ............... 716/15; 716/2; 716/4; 716/6; 716/8; 716/9; 257/208

(58) Field of Classification Search ............... 716/2, 716/4, 6, 8, 9, 15; 361/718–720; 174/250; 257/787, 208
See application file for complete search history.

(56) References Cited

U.S. PATENT DOCUMENTS 5,745,371 A    4/1998  Shouen ............... 716/15
5,781,447 A    7/1998  Gerdes ............... 716/15
6,407,462 B1   6/2002  Banouvong et al. ... 257/787
6,496,957 B1  12/2002  Kumagai ............... 716/4

2002/0024353 A1  2/2002  Lee et al. ............... 324/765
2004/0053014 A1  3/2004  Sato ............... 428/195.1
2004/0073880 A1  4/2004  Yoshida et al. ............... 716/8

FOREIGN PATENT DOCUMENTS

JP    11066134 A      3/1999
JP    11316774 A     11/1999
JP  2000242680 A      9/2000

OTHER PUBLICATIONS

Deb et al., "Multiobjective placement of electronic components using evolutionary algorithms", Sep. 2004, Components and Packaging Technologies, IEEE Transactions on, vol. 27, Issue 3, pp. 480-492.

Naft et al., "NEUROPT: neurocomputing for multiobjective design optimization for printed circuit board component placement", Jun. 18-22, 1989, Neural Networks, 1989. IJCNN., International Joint Conference on, pp. 503-506 vol. 1 □□.

(Continued)

Primary Examiner—A. M. Thompson
Assistant Examiner—Helen Rossoshek
(74) Attorney, Agent, or Firm—George R. McGuire; Bond, Schoeneck & King, PLLC

(57) ABSTRACT

An apparatus and method for selecting an optimum printed circuit board in terms of its intended use before placement of components on the printed circuit board, information about components to be mounted on the printed circuit board, and an outer size of the printed circuit board is provided. The apparatus includes an input section for inputting information, a storing section for storing information, an arithmetic section for performing an arithmetic calculation using the information stored in the storing section, a display section, and a control section. By deriving an index in the arithmetic section, selection of the optimum printed circuit board can be accomplished.

12 Claims, 3 Drawing Sheets

OTHER PUBLICATIONS

Takadama et al., "Good solutions will emerge without a global objective function: applying organizational-learning oriented classifier system to printed circuit board design", Oct. 12-15, 1997, IEEE International Conference on,vol. 4, pp. 3355-3360☐☐.

NNRD41797, "Interconnecting structure between a N ports switch module and a backplane connector", Jan. 1, 1999, Research disclosure, vol. 42, Issue number: 417.

APPARATUS AND METHOD FOR SELECTING A PRINTED CIRCUIT BOARD

FIELD OF THE INVENTION

The present invention relates to an apparatus and method for selecting a printed circuit board, and more specifically, relates to an apparatus and method for selecting an optimum printed circuit board in terms of the intended use.

BACKGROUND OF THE INVENTION

There are families of printed circuit boards that are classified according to board formation techniques or board selection standards. Printed circuit board families differ from one another in realizable wiring density. Various apparatuses and methods for selecting an optimum printed circuit board from among those families of printed circuit boards are known.

For example, in Japanese Patent Application No. H11-194611 entitled "DESIGN APPARATUS AND METHOD FOR PRINTED CIRCUIT BOARD", filed by the inventors of the present invention, and assigned to International Business Machines Corporation, the ratio between the total wiring length that can be wired on a board and the total wiring length that should be wired on a board is derived and, based on this ratio, an optimum board is selected.

The foregoing application selects an optimum board based on information about components to be mounted or position information about components to be mounted on a printed circuit board. Utilizing the component position information, the total wiring length that should be wired on the board is derived to select a printed circuit board to be used. The foregoing application describes an effective selection apparatus and method when mounting positions of components on a printed circuit board have already been determined. However, for determining the mounting positions of components on a printed circuit board, it is necessary to carry out a circuit design.

A technique for selecting a printed circuit board to be used before performing a circuit design is known. In such a known technique, a printed circuit board is selected based on the ratio between the total number of pins of components to be used in a circuit and an area of the printed circuit board, or based on the ratio between the total area of components to be mounted and an area of the printed circuit board. However, in the known technique, only an rough approximation can be obtained.

Accordingly there is a need in the art for an apparatus and method for more accurately selecting a printed circuit board for assembly without performing a circuit design.

OBJECTS AND SUMMARY OF THE INVENTION

Accordingly an object of the present invention is to provide a method and apparatus for selecting an optimum printed circuit board before placement of components thereon as a function of the intended use (e.g. a printed circuit board for use in a notebook personal computer, or a printed circuit board for use in a digital video camera), information about components to be mounted on the optimum printed circuit board, and an outer size of the printed circuit board.

According to one aspect of the present invention there is provided an apparatus for selecting an optimum printed circuit board in terms of intended use, the apparatus comprising board information storing means for storing information about a plurality of printed circuit boards and component information storing means for storing information about components to be mounted on the plurality of printed circuit boards. The apparatus includes pin number calculating means for deriving a total number of signal pins, a total number of power supply pins and a total number of non-connected pins based on a total number of pins of the components to be mounted on the optimum printed circuit board stored by the component information storing means, between-signal connection number calculating means for deriving a total number of connections between signal pins based on the total number of signal pins and power supply connection number calculating means for deriving a total number of connections relative to a power supply layer of the optimum printed circuit board based on the total number of power supply pins. The apparatus also includes minimum total wiring length calculating means for deriving a minimum total wiring length in the optimum printed circuit board based on the total number of connections between the signal pins and the board information, maximum total wiring length calculating means for deriving a maximum total wiring length in the optimum printed circuit board based on the total number of connections between the signal pins, the total number of connections relative to the power supply layer and the board information, and index calculating means for deriving an index representing a ratio of the maximum total wiring length to the minimum total wiring length.

According to another aspect of the present invention there is provided a method of selecting an optimum printed circuit board in terms of intended use, the method comprising the steps of storing information about a plurality of printed circuit boards and storing information about components to be mounted on the plurality of printed circuit boards. The method includes deriving a total number of signal pins, a total number of power supply pins and a total number of non-connected pins based on a total number of pins of components to be mounted on the optimum printed circuit board, which is stored in the step of storing information about components, deriving a total number of connections between signal pins based on the total number of signal pins, and deriving a total number of connections relative to a power supply layer of the optimum printed circuit board based on the total number of power supply pins. The method also includes deriving a minimum total wiring length in the optimum printed circuit board based on the total number of connections between the signal pins and the board information, deriving a maximum total wiring length in the optimum printed circuit board based on the total number of connections between signal pins, the total number of connections relative to the power supply layer and the board information, and deriving an index representing a ratio of the maximum total wiring length to the minimum total wiring length.

According to yet another aspect of the present invention there is provided an article of manufacture comprising a computer usable medium having a computer readable program code means embodied therein for causing a selection of an optimum printed circuit board in terms of intended use, the computer readable program code means in the article of manufacture comprising computer readable program code means for causing a computer to effect storage of information about a plurality of printed circuit boards and computer readable program code means for causing the computer to store information about components to be mounted on the plurality of printed circuit boards. The article of manufacture includes computer readable program code means for causing the computer to derive a total number of signal pins, a total number of power supply pins and a total number of non-connected pins based on a total number of pins of the components to be mounted on the optimum printed circuit board stored by the component information storing means, computer readable program code means for causing the computer to derive a total number of connections between signal pins based on the total number of the signal pins, and computer readable program code means for causing the computer to derive a total number of connections relative to a power supply layer of the optimum printed circuit board based on the total number of power supply pins. The article of manufacture also includes computer readable program code means for causing the computer to derive a minimum total wiring length in the optimum printed circuit board based on the total number of connections between the signal pins and the board information, computer readable program code means for causing the computer to derive a maximum total wiring length in the optimum printed circuit board based on the total number of connections between the signal pins, the total number of connections relative to the power supply layer and the board information, and computer readable program code means for causing the computer to derive an index representing a ratio of the maximum total wiring length to the minimum total wiring length.

According to still yet another aspect of the present invention there is provided a program storage device readable by machine, tangibly embodying a program of instructions executable by the machine to perform method steps for selecting an optimum printed circuit board in terms of intended use, the method comprising the steps of storing information about a plurality of printed circuit boards, storing information about components to be mounted on the plurality of printed circuit boards, deriving a total number of signal pins, a total number of power supply pins and a total number of non-connected pins based on a total number of pins of components to be mounted on the optimum printed, circuit board, which is stored in the step of storing information about components, deriving a total number of connections between signal pins based on the total number of signal pins, and deriving a total number of connections relative to a power supply layer of the optimum printed circuit board based on the total number of power supply pins. The method includes deriving a minimum total wiring length in the optimum printed circuit board based on the total number of the connections between the signal pins and the board information, deriving a maximum total wiring length in the optimum printed circuit board based on the total number of connections between signal pins, the total number of connections relative to the power supply layer and the board information, and deriving an index representing a ratio of the maximum total wiring length to the minimum total wiring length.

According to another aspect of the invention there is provided a method of selecting an optimum printed circuit board in terms of intended use, the method comprising the steps of storing information about a plurality of printed circuit boards by a board information storing means, deriving a minimum total wiring length in the optimum printed circuit board based on a total number of connections between signal pins and the board information by a minimum total wiring length calculating means, deriving a maximum total wiring length in the optimum printed circuit board based on the total number of connections between the signal pins, a total number of connections relative to a power supply layer and the board information by a maximum total wiring length calculating means, deriving an index representing a ratio of the maximum total wiring length to the minimum total wiring length by an index calculating means, and utilizing the index to select the optimum printed circuit board.

BEST MODE FOR CARRYING OUT THE INVENTION

Figure 1:
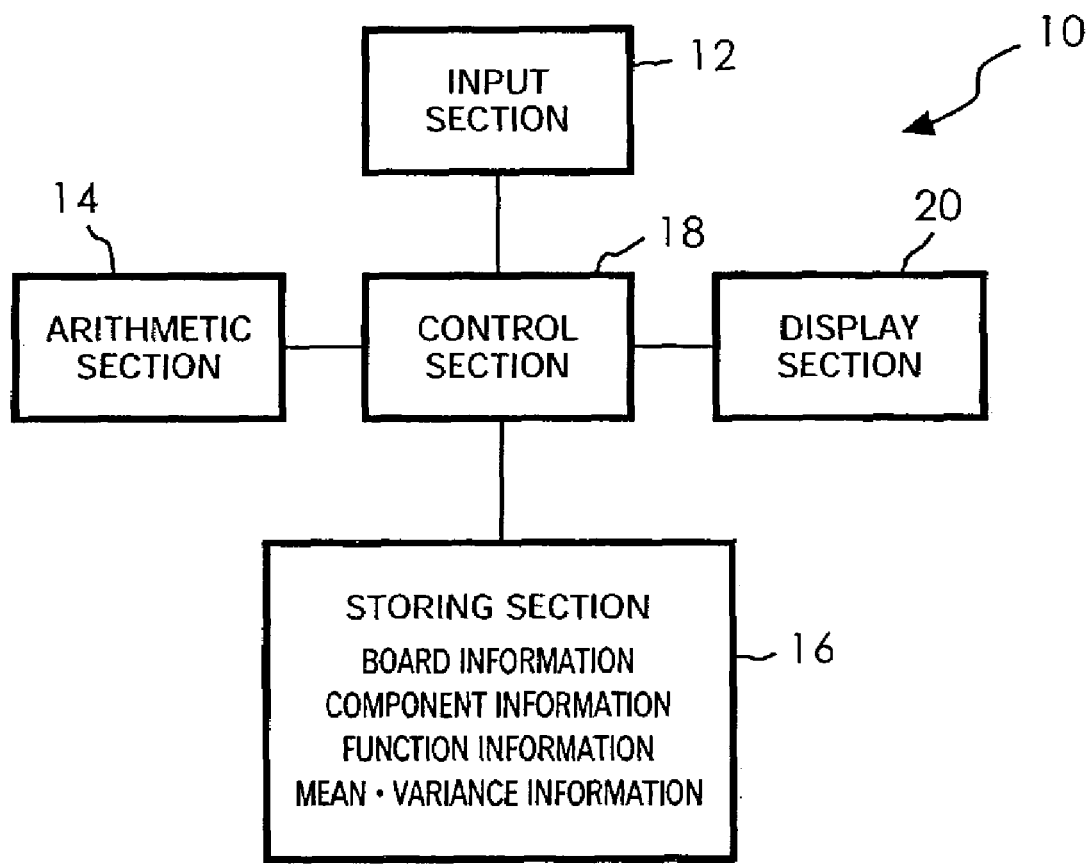
FIG. 1 is a structural diagram showing a configuration of a printed circuit board selection apparatus according to the present invention.

A preferred embodiment of the present invention will be described with reference to the drawings. FIG. 1 shows a configuration of a printed circuit board selection apparatus 10 according to the present invention. The selection apparatus 10 comprises an input section 12, a storing section 16 for storing information, an arithmetic section 14 for performing an arithmetic calculation using information stored in storing section 16, a display section 20 for displaying a calculation result, and a control section 18 for controlling input section 12, storing section 16, arithmetic section 14 and display section 20.

Figure 2:
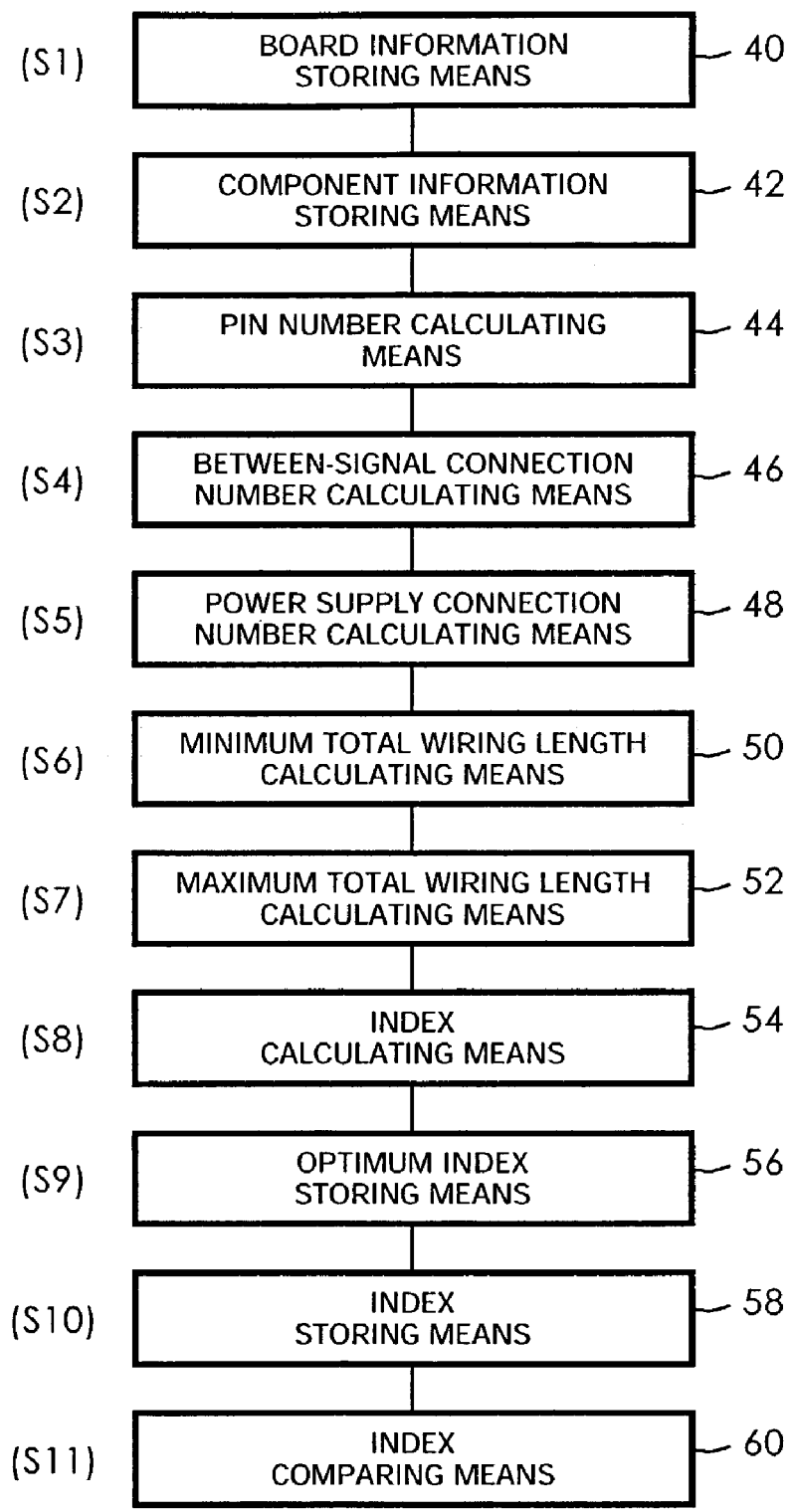
FIG. 2 is a flowchart of a printed circuit board selection apparatus and method according to the present invention.

Referring now to FIG. 2, the selection apparatus 10 includes board information storing means 40 for storing information regarding different intended uses of printed circuit board 30, component information storing means 42 for storing information about components to be mounted on printed circuit board 30, and pin number calculating means 44 for deriving the total number of signal pins, the total number of power supply pins and the total number of non-connected pins based on the total number of pins of all components to be mounted on printed circuit board 30. Selection apparatus 10 also includes between signal connection number calculating means 46 for deriving the total number of connections between signal pins based on the total number of the signal pins derived by pin number calculating means 44, and power supply connection number calculating means 48 for deriving the total number of connections relative to a power supply layer of printed circuit board 30 based on the total number of the power supply pins derived by pin number calculating means 44. Selection apparatus 10 further includes minimum total wiring length calculating means 50 for deriving the minimum total wiring length in printed circuit board 30 based on the total number of the connections between the signal pins derived by between-signal connection number calculating means 46 and the board information stored by board information storing means 40, maximum total wiring length calculating means 52 for deriving the maximum total wiring length in printed circuit board 30 based on the total number of the connections between the signal pins derived by between-signal connection number calculating means 46, the total number of the connections relative to the power supply layer derived by power supply connection number calculating means 48 and the board information stored by board information storing means 40, and index calculating means 54 for deriving an index representing the ratio of the maximum total wiring length derived by maximum total wiring length calculating means 52, to the minimum total wiring length derived by the minimum total wiring length calculating means 50. A pin in the present invention represents a lead, terminal or electrode in or on a component to be mounted on printed circuit board 30.

Figure 3:
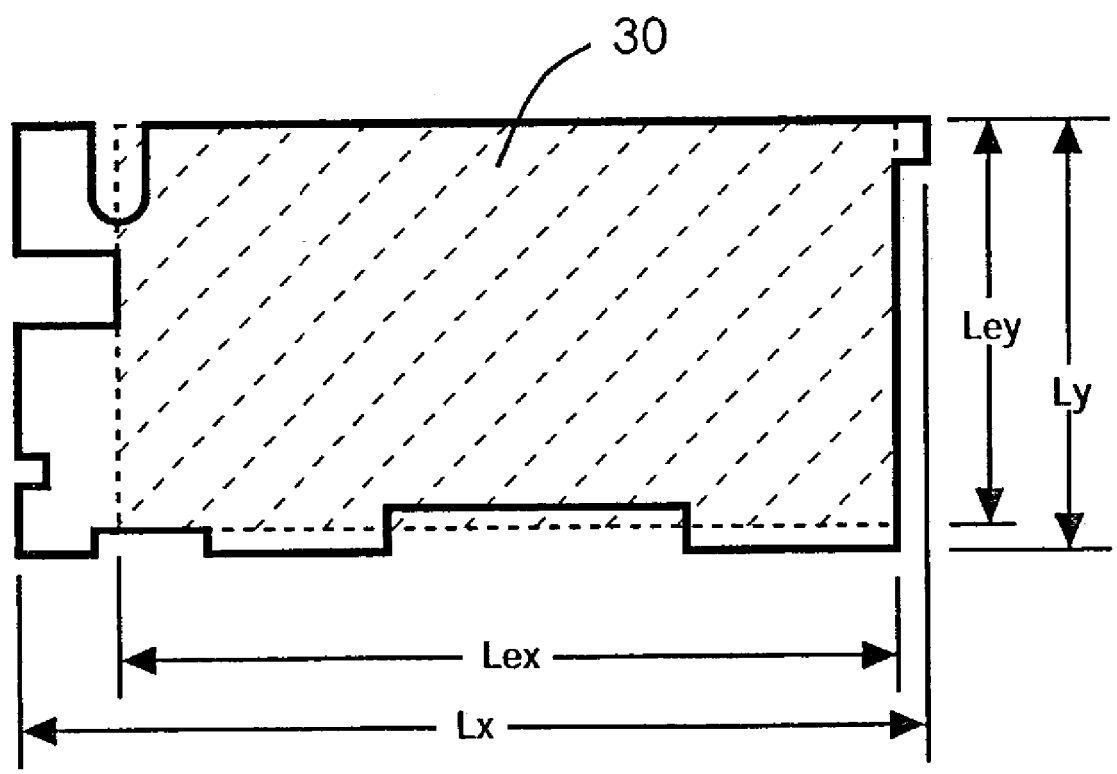
FIG. 3 is a plan view of a printed circuit board of one embodiment of the present invention.

The board information storing means 40 comprises board 30 inputted information (board 30 is shown in FIG. 3), inputted through input section 12, and stored in storing section 16. As described in more detail below, board 30 information includes information about outer size, effective length in an X-direction, effective length in a Y-direction, a fourth function, number of vias, grids and so forth with respect to the board, which differ based on intended board use. In the example described below, printed circuit board 30 is employed in a notebook personal computer or digital camera application.

The component information storing means 42 comprises information about components to be mounted on printed circuit board 30 inputted through input section 12, and stored in storing section 16. As described in much more detail below, stored information about the components includes the total number of pins, the ratio of the number of signal pins to the total number of pins, the ratio of the number of power supply pins to the total number of pins, and the ratio of the number of non-connected pins to the total number of pins, with respect to each of the components. A first, second, and third function which differ based on intended use are also stored in information storing means 42.

The pin number calculating means 44 utilizes arithmetic section 14 to derive the total number of the signal pins and the total number of the power supply pins on the board. The storing section 16 stores therein the total number of the pins for each of the components to be mounted on printed circuit board 30. The storing section 16 further stores therein the ratios of the number of signal pins, the number of power supply pins and the number of non-connected pins to the total number of pins, respectively, with respect to each component. Arithmetic section 14 can derive the total number of the signal pins and the total number of the power supply pins for printed circuit board 30 using the respective ratios of the number of the signal pins and the number of the power supply pins to the total number of the pins for each component.

Further, pin number calculating means 44 includes means for estimating the ratios of the number of the signal pins, the number of the power supply pins and the number of the non-connected pins to the total number of the pins, respectively, with respect to each of the components to be mounted on printed circuit board 30.

The between-signal connection number calculating means 46 utilizes arithmetic section 14 to derive the total number of connections between the signal pins in the components to be mounted on printed circuit board 30. The storing section 16 stores therein the first function that differs based on intended use. The between-signal connection number calculating means 46 derives the total number of the connections between the signal pins using the total number of the signal pins derived by pin number calculating means 44 and the first function.

The power supply connection number calculating means 48 utilizes arithmetic section 14 to derive the total number of connections relative to the power supply layer, from the components to be mounted on printed circuit board 30. The storing section 16 stores therein the second and third functions that differ based on intended use. The power supply connection number calculating means 48 derives the total number of the connections relative to the power supply layer of printed circuit board 30 using the total number of the signal pins derived by pin number calculating means 44 and the second and third functions.

The minimum total wiring length calculating means 50 utilizes arithmetic section 14 to derive the minimum total wiring length in printed circuit board 30. The storing section 16 stores therein the outer size, the X-direction effective length, the Y-direction effective length and the fourth function for board 30, which differs based on intended use. The minimum total wiring length calculating means 50 derives the minimum total wiring length in printed circuit board 30 using the outer size, the X-direction effective length, the Y-direction effective length, the fourth function and the total number of the connections between signal pins with respect to the board.

The maximum total wiring length calculating means 52 utilizes arithmetic section 14 to derive the maximum total wiring length in printed circuit board 30. The storing section 16 stores therein information about the number of vias which differ per type of printed circuit board 30. Further, storing section 16 stores therein information about the outer size, grids and so forth of printed circuit board 30. The maximum total wiring length calculating means 52 calculates a non-wiring area from the information about the number of the vias and so forth, and calculates a possible wiring area from the information about the outer size and so forth of printed circuit board 30. The maximum total wiring length calculating means 52 derives the maximum total wiring length that can be wired on printed circuit board 30, using information about the possible wiring area, the non-wiring area and the grids. When planning wiring on printed circuit board 30, reference lines that are mutually orthogonal are provided on board 30 at regular intervals, and the wiring is drawn on these reference lines. These reference lines are called grids.

The index calculating means 54 utilizes arithmetic section 14 to derive an index using equation (1) below.

$$\text{index} = (\text{maximum total wiring length})/(\text{minimum total wiring length}) \tag{1}$$

In addition to the foregoing index calculation means 54, selection apparatus 10 further comprises optimum index storing means 56 for storing an optimum index in terms of the intended use, index storing means 58 for storing an index derived by index calculating means 54, and index comparing means 60 for comparing the optimum index stored by optimum index storing means 56 and the index stored by index storing means 58.

The optimum index storing means 56 comprises optimum index inputted information in terms of intended use, inputted through input section 12, and stored in storing section 16.

The index storing means 58 stores the value of the index derived by index calculating means 54 into storing section 16.

The index comparing means 60 comprises arithmetic section 14 to compare the value of the optimum index and the value of the index stored in storing section 16.

Further, the present invention includes means for selecting the optimum printed circuit board 30 for use using a variance value in the fourth function stored by board information storing means 40.

The printed circuit board selection apparatus 10 according to one aspect of the present invention can have the configuration as described above. Hereinbelow the printed circuit board selection method according to another aspect of the present invention will be described along with operation and output of printed circuit board selection apparatus 10.

The present invention obtains an optimum printed circuit board 30 in terms of its intended use. In this embodiment, explanation will be given for one example wherein a printed circuit board for use in a notebook personal computer is selected. In the present invention, the intended use of a printed circuit board is not limited to the notebook personal computer. The present invention is also applicable, for example, to selection of a printed circuit board for use in hard disk control, PCMCIA, digital video camera, base station or the like.

As shown in FIG. 2, the printed circuit board selection method of the present invention comprises the steps of (S1), storing information about printed circuit board 30 that differs based on intended use, (S2), storing information about components to be mounted on printed circuit board 30 and, (S3), deriving the total number of signal pins, the total number of power supply pins and the total number of non-connected pins based on the total number of pins of all the components to be mounted on printed circuit board 30 stored in step (S2). The method includes the steps of (S4), deriving the total number of connections between signal pins based on the total number of the signal pins derived in step (S3), (S5), deriving the total number of connections relative to a power supply layer of printed circuit board 30 based on the total number of the power supply pins derived in step (S3), (S6), deriving the minimum total wiring length in printed circuit board 30 based on the total number of the connections between signal pins derived in step (S4) and the board information stored in step (S1),(S7), deriving the maximum total wiring length in printed circuit board 30 based on the total number of the connections between signal pins derived in step (S4), the total number of the connections relative to the power supply layer derived in step (S5) and the board information stored in step (S1), and (S8), deriving an index representing the ratio of the maximum total wiring length derived in step (S7), to the minimum total wiring length derived in step (S6).

Further, the printed circuit board selection method according to the present invention includes step (S9), storing an optimum index in terms of intended use, step (S10), storing an index derived in step (S8), and step (S11), comparing the optimum index stored in step (S9) and the index stored in step (S10).

In summary, steps (S1) and (S2) store the necessary information. Steps (S3) to (S5), derive the numerical value required in step (S6). Step (S8) derives the index representing the ratio of the numerical value derived in step (S7) to the numerical value derived in step (S6). Step (S11) compares the index derived in S8 with the optimum index to select the target printed circuit board 30.

The printed circuit board 30 differs in realizable wiring density depending on the type of board for the desired application. Depending on the realizable wiring density, a grade is set for each type of board. Hereinafter, "selecting printed circuit board 30" represents "selecting a grade of printed circuit board 30".

Step (S1) is accomplished by the board information storing means 40. Selecting a particular printed circuit board 30 to be evaluated determines the outer size of the printed circuit board. Step (S1) includes storing the outer size of printed circuit board 30 in storing section 16 as board information. As shown in FIG. 3, an X-direction length Lx of target printed circuit board 30, a Y-direction length Ly thereof, an X-direction effective length Lex thereof, a Y-direction effective length Ley thereof, and an actual area thereof are also stored as the board information. The X-direction effective length Lex of target printed circuit board 30 represents an X-direction length of a portion of the target printed circuit board where wiring is actually possible.

The X-direction effective length Lex of printed circuit board 30 and the Y-direction effective length Ley of the board are derived by equations (2), (3) and (4), wherein k represents a function that differs based on intended use of the board.

$$Lex = Lx \times \sqrt{k} \qquad (2)$$

$$Ley = Ly \times \sqrt{k} \qquad (3)$$

$$k = (\text{board actual area})/(Lx \times Ly) \qquad (4)$$

The board information includes the fourth function shown in Table 1. This fourth function is used for deriving the minimum wiring lengths in both the X-direction and the Y-direction. Specifically, the mean of the ratios of the X-direction minimum wiring lengths to the X-direction effective length (Lex), the mean of the ratios of the Y-direction minimum wiring lengths to the Y-direction effective length (Ley), a variance value of the mean in the X-direction, and a variance value of the mean in the Y-direction in the notebook personal computer printed circuit board are derived. These values differ based on intended purpose of use.

Use of the mean of the ratios of the X-direction minimum wiring lengths to the X-direction effective length (Lex) is explained herein. The ratio of the X-direction minimum wiring length to the X-direction effective length is determined based on the intended purpose of use of printed circuit board 30. In the case of a printed circuit board intended for use in a notebook personal computer as an example, the mean of the X-direction minimum wiring lengths is 0.3 times the X-direction effective length. Therefore, the mean of the ratios of the X-direction minimum wiring lengths is used for estimating the X-direction minimum wiring length. The mean of the ratios of the X-direction minimum wiring lengths includes a variance value. This variance value is expressed as a variance value of the mean in the X-direction. These mean and variance values can be derived based on historical information from known printed circuit board designs.

TABLE 1

| purpose of use | ratio mean X-direction | ratio mean Y-direction | Mean variance X-direction | Mean variance Y-direction |
| --- | --- | --- | --- | --- |
| notebook PC | 0.3 × Lex | 0.3 × Ley | 0.22 × Lex | 0.22 × Ley |
| hard disk control | 0.5 × Lex | 0.5 × Ley | 0.15 × Lex | 0.15 × Ley |
| PCMCIA | 0.6 × Lex | 0.6 × Ley | 0.12 × Lex | 0.12 × Ley |
| digital video | 0.4 × Lex | 0.4 × Ley | 0.2 × Lex | 0.2 × Ley |
| base station | 0.25 × Lex | 0.25 × Ley | 0.25 × Lex | 0.25 × Ley |

The board information includes information about the number of vias as shown in Table 2. Specifically, the number of Plated Through Hole (PTH) vias and the number of microvias are defined per grade of printed circuit board 30. The number of the PTH vias and the number of the microvias can be derived based on historical information from known printed circuit board designs.

TABLE 2

| grade | number of PTH vias | number of microvias (FV1/BV1) | number of microvias (FV2/BV2) |
|---|---|---|---|
| FR4 | (number of signals × 1.1) + number of power supplies | | |
| SLC(1 + 1 on 4S2P) | (number of signals × 0.5) + number of power supplies | number of signals × 0.6 | |
| SLC(1 + 1 on 6S2P) | (number of signals × 0.6) + number of power supplies | number of signals × 0.6 | |
| SLC(2 + 2 on 2S2P) | (number of signals × 0.25) + number of power supplies | number of signals × 0.5 | number of signals × 0.5 |
| SLC(2 + 2 on 4S2P) | (number of signals × 0.3) + number of power supplies | number of signals × 0.5 | number of signals × 0.5 | number of signals: total number of connections between signal pins
number of power supplies: total number of connections relative to power supply layer The plurality of numerical values (numerical values in Table 1, and numerical values and functions in Table 2) stored by the board information storing means 40 have a particular correlation depending on intended use.

Step (S2) is accomplished by the component information storing means 42. As shown in Table 3, the component information stored includes the whole number of pins for a particular component (column 1), the ratio of the number of signal pins to the whole number of the pins, the ratio of the number of power supply pins to the whole number of the pins, and the ratio of the number of non-connected pins to the whole number of the pins for each of the components to be mounted on the notebook personal computer. Herein, the number of the power supply pins for a component represents the sum of the number of ground pins and the number of feed pins. The ratio between the number of the ground pins and the number of the feed pins in the number of the power supply pins differs per component. The ground pin represents a pin for grounding, while the feed pin represents a pin for feeding power. The whole number of the pins represents the whole number of pins for a component to be mounted on printed circuit board 30.

TABLE 3

| | number of signal pins | number of power supply pins | number of non-connected pins |
|---|---|---|---|
| no less than QFP 200 pins | 70% | 20% | 10% |
| QFP 100 pins to less than 200 pins | 78% | 14% | 8% |
| less than QFP 100 pins | 85% | 10% | 5% |
| BGA ### | ##% | ##% | ##% |
| CSP ### | ##% | ##% | ##% |
| Resister | ##% | ##% | ##% |
| Capacitor | ##% | ##% | ##% |
| Crock | ##% | ##% | ##% |
| #### | ##% | ##% | ##% |
| #### | ##% | ##% | ##% |

The stored component information includes the first function. The first function can be defined as a numerical value that differs based on intended use and represents the ratio of the total number of the signal connections to the total number of the signal pins of all the components to be mounted. In the case of a notebook personal computer printed circuit board, the value of the first function is 0.5. In other words, 50% of signal pins make signal connections with printed circuit board 30. The other 50% are utilized to make connections between signal pins. For example, if the component to be mounted on printed circuit board 30 is a Quad Flat Package (QFP) having 200 pins, the ratio of the whole number of the signal pins to the whole number of the pins will be equivalent to the ratio of the total number of signal connections to the total number of signal pins for all components to be mounted on the printed circuit board from Table 3. The ratio will therefore be 70% and the whole number of signal pins would be 140. The whole number of the signal connections is 140 pins×0.5 or 70 connections. Hereinafter, "the total number" represents the number in total of all the components to be mounted on printed circuit board 30, while "the whole number" represents the number for each of the components to be mounted on the printed circuit board.

The component information includes the second function. The second function can be defined as a numerical value that differs based on intended use and represents the ratio of the total number of the ground connections to the total number of the ground pins. In case of the notebook personal computer printed circuit board, the value of the second function is 1.5. The total number of the ground pins represents the total number of pins that are used for grounding and are determined per component. The total number of the ground connections represents the total number of the ground pins that are actually used. For the QFP having 200 pins, the ratio between the number of the ground pins and the number of the feed pins in the number of the power supply pins is 1:1. Accordingly, inasmuch as the number of the ground pins and the number of the feed pins are equal to each other, the ratio of the number of the ground pins to the number of the power supply pins becomes half, i.e. 50%. The ratio of the number of the ground pins to the whole number of the pins (200 pins) is 10% (50% of the value for power supply pins in Table 3) or 20 pins. The whole number of the ground connections is 150% of the number of the ground pins, i.e. 30 pins.

The component information includes the third function. The third function can be defined as a numerical value that differs based on intended use and represents the ratio of the total number of the feed connections to the total number of the feed pins. In case of the notebook personal computer printed circuit board, the value of the third function is 1.2. The total number of the feed pins represents the total number of pins that are used for power feeding per component. The total number of the feed connections represents the total number of pins that are actually connected for power feeding. Using the QFP example having 200 pins, the ratio of the number of the feed pins to the whole number of the pins is 10% (50% of the value for power supply pins in Table 3) or 20 pins, while the whole number of the feed connections is 120% of the number of the feed pins or 24 pins.

The plurality of numerical values (numerical values and functions in Table 3) stored by the component information storing means 42 have a particular correlation depending on intended use and have been specified as such.

Step (S3) is accomplished by pin number calculating means 44. Step (S3) comprises multiplying the whole number of the pins of each of the components to be mounted on printed circuit board 30 by the values shown in Table 3 to derive the whole number of the signal pins and the whole number of the power supply pins. For the QFP example having 200 pins or more, the ratio of the number of the signal pins to the whole number of pins is 70%, while the ratio of the number of the power supply pins to the whole number of pins is 20%. Accordingly, when the whole number of the pins is 200 pins, the whole number of the signal pins is 140 pins, while the whole number of the power supply pins is 40 pins. With respect to each of all the components to be mounted on printed circuit board 30, the whole number of the signal pins and the whole number of the power supply pins are derived. By obtaining the sum of the derived whole numbers of the signal pins, the total number of the signal pins can be derived. By obtaining the sum of the derived whole numbers of the power supply pins, the total number of the power supply pins can be derived.

Step (S4) is accomplished by the between-signal connection number calculating means 46. By multiplying the whole number of the signal pins per component derived in step (S3) by the first function of 0.5 and deriving the sum thereof, the total number of the connections between the signal pins can be derived.

Step (S5) is accomplished by power supply connection number calculating means 48. Step (S5) comprises dividing the whole number of power supply pins per component derived in step (S3) into the number of ground pins and the number of feed pins using the ration that differs per component. By multiplying the whole number of the ground pins per component by the second function of 1.5 and deriving the sum thereof, the total number of the ground connections is derived. For the QFP example with 200 pins the number of ground connections would be 1.5 (20) or 30. Simultaneously, by multiplying the whole number of feed pins per component by the third function of 1.2 and deriving the sum thereof, the total number of the feed connections is derived. By deriving the sum of the total number of the ground connections and the total number of the feed connections, the total number of the connections relative to the power supply layer of printed circuit board 30 can be derived.

Step (S6) is accomplished by minimum total wiring length calculating means 50. Step (S6) comprises multiplying the X-direction effective length (Lex) by the fourth function of 0.3 shown in Table 1, to derive the X-direction minimum wiring length. By multiplying the X-direction minimum wiring length by the number of the X-direction grids, the X-direction minimum total wiring length is derived. Similarly, by multiplying the Y-direction effective length (Ley) by the fourth function of 0.3 shown in Table 1, the Y-direction minimum wiring length is derived. By multiplying the Y-direction minimum wiring length by the number of the Y-direction grids, the Y-direction minimum total wiring length is derived. By deriving the sum of the X-direction minimum total wiring length and the Y-direction minimum total wiring length, the minimum total wiring length in printed circuit board 30 can be derived.

Step (S7) is accomplished by the maximum total wiring length calculating means 52. Step (S7) comprises deriving the maximum total wiring length using equation (5).

maximum total possible wiring length=(possible wiring area of printed circuit board)/(grid interval)  (5)

Further, the possible wiring area of the board 30 can be derived by equation (6).

possible wiring area of printed circuit board=(area of printed circuit board)−(non-wiring area of printed circuit board)  (6)

The area of the board 30 can be derived by equation (7).

area of board=$Lx \times Ly$  (7)

The non-wiring area in equation (6) is the sum of areas where wiring is not possible such as board outer edge portions, assembling holes, conductive pads, pinholes and via holes. The areas of the board outer edge portions and the assembling holes can be derived from the board information. The areas of the conductive pads and the pinholes can be derived from the component information. When the number of the via holes is known from Table 2, the area of the via holes can be derived. Hole areas include areas of lands associated with the holes.

In Table 2, type "SLC (1+1) on 4S2P)" (wherein, SLC is an abbreviation for Surface Laminar Circuit™ a Trademark of the International Business Machines Corporation) represents the printed circuit board 30 with one buildup layer on each side of a base substrate (1+1) of 4S2P (four signal layers and two power supply layers) made of FR4 (glass cloth epoxy material). The number of the via holes is derived as the sum of the number of PTH vias and the number of microvias. "FV1/BV1" represents the first buildup layer formed on the FR4 substrate, while "FV2/BV2" represents the second buildup layer on the first buildup layer.

Using the types of printed circuit board 30 shown in column 1 of Table 2, the total number of the connections between the signal pins obtained in step (S4) and the total number of the connections relative to the power supply layer obtained in step (S5) allows the number of the via holes to be derived. An area of a via hole is determined based on the type of board 30. By deriving the total area of the via holes from the number of the via holes, the non-wiring via area and the total resultant non-wiring area on the board can be derived.

By deriving the non-wiring area, the possible wiring area of printed circuit board 30 can be derived using equation (6). The maximum total wiring length can then be derived using equation (5) utilizing grid interval information stored as board information in storing section 16.

Step (S8) is accomplished by the index calculating means 54. Step (S8) comprises deriving the index from equation (1). Specifically, the index can be derived by deriving the ratio of the maximum total wiring length obtained in step (S7) to the minimum total wiring length obtained in step (S6).

Step (S9) is accomplished by optimum index storing means 56. The optimum value of the index differs depending on the intended use of printed circuit board 30. The optimum value of the index of printed circuit board 30 for use in the notebook personal computer falls within a range of 4.25 to 4.75.

Step (S10) can be accomplished by index storing means 58, wherein the index obtained in step (S8) is stored.

Step (S11) can be accomplished by index comparing means 60. The grade of printed circuit board 30 to be used is selected by comparing the optimum index stored in step (S9) and the index stored in step (S10). Steps (S1) to (S8) are executed with respect to printed circuit board 30 of each type, thereby deriving an index for each board 30. Through comparison between the respective indexes and the optimum index, those boards of the grades falling outside the optimum index range are excluded from the selection target. From the boards of the remaining grades, the type of printed circuit board 30 optimum to the application is determined. For example, a board that is low in degree of freedom for circuit design can be selected if low cost is sought. On the other hand, if a board with a high degree of freedom for circuit design is sought, a board that is high in cost can be selected.

As described above, by comparing the index and the optimum index, the grade of the printed circuit board most suitable for the application can be selected. This makes it possible to select optimum printed circuit board 30 in terms of its intended use.

The printed circuit board selection apparatus 10 and method according to the present invention have been described with reference to the drawings. However, the present invention is not limited to the embodiment illustrated in the drawings. The present invention can be embodied in a manner applied by an improvement, modification or change based on knowledge of a person skilled in the art within a range without departing from the scope of the present invention.

In the foregoing embodiment, pin number calculating means 44 uses the ratios of the number of the signal pins, the number of the power supply pins and the number of the non-connected pins to the whole number of the pins per component, which are stored beforehand by component information storing means 42. However, such information about the ratios of the number of the signal pins, the number of the power supply pins and the number of the non-connected pins can be estimated based on intended use of printed circuit board 30. This is because the ratios of the number of the signal pins, the number of the power supply pins and the number of the non-connected pins per component to be mounted on printed circuit board 30 have a certain relationship based on intended use.

In the foregoing embodiment the cost per grade of the board is used as a criterion for selection of printed circuit board 30. Instead of cost, it is also possible to perform selection of printed circuit board 30 using the variance value in the fourth function stored by board information storing means 40. The reason is that by referring to the variance condition of the mean of the minimum wiring lengths that was used upon calculating the index, the reliability of the obtained index can be estimated and, by referring to the reliability of the index, the selection of printed circuit board 30 can be carried out.

According to the printed circuit board selection apparatus and method of the present invention, an optimum printed circuit board in terms of intended use can be selected based on board information per intended use of a printed circuit board, information about components to be mounted on the board, and an outer size of the printed circuit board, before performing placement of the components.

While there have been shown and described what are the present considered preferred embodiments of the invention, it will be obvious to those skilled in the art that various changes and modifications may be made therein without departing from the scope of the invention as defined by the appended claims.

We claim:

1. An apparatus for selecting an optimum printed circuit board based on an intended use of the printed circuit board, said apparatus comprising:
   board information storing means for storing information about a plurality of printed circuit boards;
   component information storing means for storing information about components to be mounted on said plurality of printed circuit boards wherein said component information differs based on the intended use of the printed circuit board;
   pin number calculating means for deriving a total number of signal pins, a total number of power supply pins and a total number of non-connected pins based on a total number of pins of said components to be mounted on said optimum printed circuit board stored by said component information storing means, comprising
   deriving a ratio of a number of signal pins to said total number of pins, a ratio of a number of power supply pins to said total number of pins, and a ratio of a number of non-connected pins to said total number of pins, which are stored by said component information storing means;
   between-signal connection number calculating means for deriving a total number of connections between signal pins based on said total number of signal pins, which includes a first function stored by said component information storing means;
   power supply connection number calculating means for deriving a total number of connections relative to a power supply layer of said optimum printed circuit board based on said total number of power supply pins, wherein said power supply connection number calculating means comprises:
     means for deriving a total number of ground connections using said total number of said power supply pins derived by said pin number calculating means, and a second function that is stored by said component information storing means
     means for deriving a total number of power supply connections using said total number of the power supply pins derived by said pin number calculating means, and a third function that is stored by said component information storing means; and
     means for deriving said total number of connections relative to said power supply layer of said optimum printed circuit board based on said total number of ground connections and said total number of the power supply connections;
   minimum total wiring length calculating means for deriving a minimum total wiring length in said optimum printed circuit board based on said total number of connections between said signal pins and said board information;
   maximum total wiring length calculating means for deriving a maximum total wiring length in said optimum printed circuit board based on said total number of connections between said signal pins, said total number of connections relative to said power supply layer and said board information; and
   index calculating means for deriving an index representing a ratio of said maximum total wiring length to said minimum total wiring length.

2. The apparatus according to claim 1, further comprising:
   optimum index storing means for storing an optimum index in terms of intended use of said optimum printed circuit board;
   index storing means for storing said index derived by said index calculating means; and
   index comparing means for comparing said optimum index and said index.

3. The apparatus according to claim 1, wherein said minimum total wiring length calculating means further comprises, a fourth function stored by said board information storing means and that differs based on intended use, an X-direction effective length and a Y-direction effective length of said optimum printed circuit board stored by said board information storing means, and said total number of the connections between said signal pins derived by said between-signal connection number calculating means.

4. The apparatus according to claim 3, wherein said fourth function includes:
   a mean of ratios of X-direction minimum wiring lengths relative to said X-direction effective length;

a mean of ratios of Y-direction minimum wiring lengths relative to said Y-direction effective length;

a variance value in said mean of ratios of X-direction minimum wiring lengths relative to said X-direction effective length; and a variance value in said mean of ratios of Y-direction minimum wiring lengths relative to said Y-direction effective length, and wherein means is provided for using said variance values for selecting said optimum printed circuit board based on intended use.

5. The apparatus according to claim 2, wherein said pin number calculating means comprises means for estimating said ratios of said number of signal pins, said number of power supply pins and said number of non-connected pins to said total number of pins, respectively, with respect to each of said components to be mounted on said optimum printed circuit board.

6. The apparatus according to claim 5, wherein said between-signal connection number calculating means for deriving said total number of the connections between said signal pins using said total number of said signal pins derived by said pin number calculating means includes a first function stored by said component information storing means and that differs based on intended use.

7. A method of selecting an optimum printed circuit board based on an intended use of the printed circuit board, said method comprising the steps of:

storing information about a plurality of printed circuit boards;

storing information about components to be mounted on said plurality of printed circuit boards wherein said component information differs based on the intended use of the printed circuit board;

deriving a total number of signal pins, a total number of power supply pins and a total number of non-connected pins based on a total number of pins of components to be mounted on said optimum printed circuit board, which is stored in said step of storing information about components;

deriving a total number of connections between signal pins based on said total number of signal pins;

deriving a total number of connections relative to a power supply layer of said optimum printed circuit board based on said total number of the power supply pins;

deriving a minimum total wiring length in said optimum printed circuit board based on said total number of connections between said signal pins and said board information;

deriving a maximum total wiring length in said optimum printed circuit board based on said total number of connections between signal pins, said total number of connections relative to said power supply layer and said board information; and deriving an index representing a ratio of said maximum total wiring length to said minimum total wiring length;

wherein said step of deriving said total number of signal pins, said total number of the power supply pins and said total number of non-connected pins based on said total number of pins for said components to be mounted on said optimum printed circuit board includes deriving a ratio of a number of signal pins to said total number of pins, a ratio of a number of power supply pins to said total number of pins, and a ratio of a number of non-connected pins to said total number of pins, which are stored in the step of storing said component information;

further including estimating said ratios of said number of signal pins, said number of power supply pins and said number of non-connected pins to said total number of pins, respectively, with respect to each of said components to be mounted on said optimum printed circuit board;

wherein said step of deriving said total number of connections between signal pins includes deriving said total number of the connections using said total number of signal pins and a first function that is stored in said step of storing said component information; and wherein said step of deriving said total number of connections relative to said power supply layer comprises the steps of:

deriving a total number of ground connections using said total number of power supply pins and a second function that is stored in said step of storing said component information;

deriving a total number of power supply connections using said total number of power supply pins and a third function that is stored in said step of storing said component information; and deriving said total number of connections relative to said power supply layer of said optimum printed circuit board based on said total number of the ground connections and said total number of power supply connections.

8. The method according to claim 7, further comprising the steps of:

storing an optimum index in terms of intended use of said optimum printed circuit board;

storing said index derived in said step of deriving an index; and comparing said optimum index and said index.

9. The method according to claim 7, wherein said step of deriving said minimum total wiring length includes using a fourth function that is stored in said step of storing said board information that differs per intended use, an X-direction effective length and a Y-direction effective length of said optimum printed circuit board that are stored in the step of storing said board information, and said total number of the connections between said signal pins to derive said minimum total wiring length.

10. The method according to claim 9, wherein said fourth function includes:

a mean of ratios of X-direction minimum wiring lengths relative to said X-direction effective length;

a mean of ratios of Y-direction minimum wiring lengths relative to said Y-direction effective length;

a variance value in said mean of said ratios of the X-direction minimum wiring lengths relative to said X-direction effective length; and a variance value in said mean of the ratios of said Y-direction minimum wiring lengths relative to said Y-direction effective length, and wherein a step is provided for using said variance values for selecting said optimum printed circuit board per intended use.

11. An article of manufacture comprising a computer usable medium having a computer readable program code means embodied therein for causing a selection of an optimum printed circuit board based on an intended use of the printed circuit board, said computer readable program code means in said article of manufacture comprising:

computer readable program code means for causing a computer to effect storage of information about a plurality of printed circuit boards;

computer readable program code means for causing said computer to store information about components to be mounted on said plurality of printed circuit boards wherein said component information differs based on the intended use of the printed circuit board;

computer readable program code means for causing said computer to derive a total number of signal pins, a total number of power supply pins and a total number of non-connected pins based on a total number of pins of said components to be mounted on said optimum printed circuit board stored by said component information storing means, comprising deriving a ratio of a number of signal pins to said total number of pins, a ratio of a number of power supply pins to said total number of pins, and a ratio of a number of non-connected pins to said total number of pins, which are stored by said component information storing means;

computer readable program code means for causing said computer to derive a total number of connections between signal pins based on said total number of signal pins, which includes a first function stored by said component information storing means;

computer readable program code means for causing said computer to derive a total number of connections relative to a power supply layer of said optimum printed circuit board based on said total number of power supply pins, wherein said power supply connection number calculating means comprises:
  means for deriving a total number of ground connections using said total number of said power supply pins derived by said pin number calculating means, and a second function that is stored by said component information storing means;
  means for deriving a total number of power supply connections using said total number of the power supply pins derived by said pin number calculating means, and a third function that is stored by said component information storing means; and
  means for deriving said total number of connections relative to said power supply layer of said optimum printed circuit board based on said total number of ground connections and said total number of the power supply connections;

computer readable program code means for causing said computer to derive a minimum total wiring length in said optimum printed circuit board based on said total number of connections between said signal pins and said board information;

computer readable program code means for causing said computer to derive a maximum total wiring length in said optimum printed circuit board based on said total number of connections between said signal pins, said total number of connections relative to said power supply layer and said board information; and computer readable program code means for causing said computer to derive an index representing a ratio of said maximum total wiring length to said minimum total wiring length.

12. A program storage device readable by machine, tangibly embodying a program of instructions executable by said machine to perform method steps for selecting an optimum printed circuit board based on an intended use of the printed circuit board, said method comprising the steps of:
  storing information about a plurality of printed circuit boards;
  storing information about components to be mounted on said plurality of printed circuit boards wherein said component information differs based on the intended use of the printed circuit board;
  deriving a total number of signal pins, a total number of power supply pins and a total number of non-connected pins based on a total number of pins of components to be mounted on said optimum printed circuit board, which is stored in said step of storing information about components;
  deriving a total number of connections between signal pins based on said total number of signal pins;
  deriving a total number of connections relative to a power supply layer of said optimum printed circuit board based on said total number of power supply pins;
  deriving a minimum total wiring length in said optimum printed circuit board based on said total number of the connections between said signal pins and said board information;
  deriving a maximum total wiring length in said optimum printed circuit board based on said total number of connections between signal pins, said total number of connections relative to said power supply layer and said board information; and
  deriving an index representing a ratio of said maximum total wiring length to said minimum total wiring length;
  wherein said step of deriving said total number of signal pins, said total number of the power supply pins and said total number of non-connected pins based on said total number of pins for said components to be mounted on said optimum printed circuit board includes deriving a ratio of a number of signal pins to said total number of pins, a ratio of a number of power supply pins to said total number of pins, and a ratio of a number of non-connected pins to said total number of pins, which are stored in the step of storing said component information;
  further including estimating said ratios of said number of signal pins, said number of power supply pins and said number of non-connected pins to said total number of pins, respectively, with respect to each of said components to be mounted on said optimum printed circuit board;
  wherein said step of deriving said total number of connections between signal pins includes deriving said total number of the connections using said total number of signal pins and a first function that is stored in said step of storing said component information; and
  wherein said step of deriving said total number of connections relative to said power supply layer comprises the steps of:
  deriving a total number of ground connections using said total number of power supply pins and a second function that is stored in said step of storing said component information;
  deriving a total number of power supply connections using said total number of power supply pins and a third function that is stored in said step of storing said component information; and
  deriving said total number of connections relative to said power supply layer of said optimum printed circuit board based on said total number of the ground connections and said total number of power supply connections.

* * * * *